United States Patent
Jeon et al.

(10) Patent No.: US 9,400,590 B2
(45) Date of Patent: Jul. 26, 2016

(54) METHOD AND ELECTRONIC DEVICE FOR DISPLAYING A VIRTUAL BUTTON

(71) Applicant: Samsung Electronics Co., Ltd., Gyeonggi-do (KR)

(72) Inventors: Yu-Jeong Jeon, Seoul (KR); Bong-Kyun Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 262 days.

(21) Appl. No.: 14/095,044

(22) Filed: Dec. 3, 2013

(65) Prior Publication Data
US 2014/0157203 A1    Jun. 5, 2014

(30) Foreign Application Priority Data
Dec. 3, 2012    (KR) .................. 10-2012-0139094

(51) Int. Cl.
*G06F 3/048*    (2013.01)
*G06F 3/0482*    (2013.01)
*G06F 3/0488*    (2013.01)

(52) U.S. Cl.
CPC .......... *G06F 3/0482* (2013.01); *G06F 3/04883* (2013.01); *G06F 3/04886* (2013.01); *G06F 2203/04101* (2013.01)

(58) Field of Classification Search
CPC ............ G06F 3/03545; G06F 3/0488–3/04886
See application file for complete search history.

(56) References Cited

U.S. PATENT DOCUMENTS

| | | | | |
|---|---|---|---|---|
| 2006/0267966 | A1* | 11/2006 | Grossman | G06F 3/0346 345/179 |
| 2010/0207901 | A1* | 8/2010 | Shin | G06F 3/04883 345/173 |
| 2011/0084913 | A1* | 4/2011 | Wirtanen | G06F 3/0346 345/173 |
| 2012/0206344 | A1* | 8/2012 | Hill | G06F 3/03545 345/157 |

FOREIGN PATENT DOCUMENTS

KR    2002-0064063 A    8/2002

* cited by examiner

*Primary Examiner* — Claudia Dragoescu
(74) *Attorney, Agent, or Firm* — Cha & Reiter, LLC

(57) ABSTRACT

A method for using a pen in an electronic device is provided, including: detecting a pen use event; and responsive to the pen use event, displaying, on a display of the electronic device, at least one virtual button which performs the same function as a physical button that is part of the electronic device; wherein the physical button of the electronic device comprises at least one of a mechanical switch and an optical switch.

18 Claims, 10 Drawing Sheets

METHOD AND ELECTRONIC DEVICE FOR DISPLAYING A VIRTUAL BUTTON

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Dec. 3, 2012, and assigned Serial No. 10-2012-0139094, the entire disclosure of which is hereby incorporated by reference.

TECHNICAL FIELD

The present disclosure relates generally to an electronic device and more particularly to a method and an apparatus for displaying a virtual button.

BACKGROUND

As technology has advanced, portable terminals have begun to be used as multimedia devices supporting functions such as schedule management, games, remote control, and image capturing. In particular, advanced portable terminals may provide touch screens for data input along with various user interfaces for operating the touch screens. Moreover, some portable terminals provide stylus pens for interacting with the touch screen user interfaces. When a stylus pen is used, touch screens can be controlled more finely than with a user's finger. For this reason, the popularity of stylus pen-enabled portable terminals is increasing.

In addition to touch screens, portable terminals provide physical buttons for controlling aspects of their operation, such as a volume increase/decrease buttons, power on/off buttons, mute buttons, and others. Such buttons may be mechanically actuated, and may require to be pressed (or otherwise touched) by the user in order to be activated. When a stylus pen is used, the user often cannot grasp the stylus pen and interact with the physical buttons at the same time. Accordingly, to interact with the physical buttons, the user has to first lay down the stylus pen and then manipulate the physical buttons. This, however, may disrupt the user's interactions with the portable terminal and be a source of inconvenience to the user.

Accordingly, the need exists for improved user interfaces for controlling the operation of portable terminals.

SUMMARY

According to one aspect, a method for using a pen in an electronic device is provided, comprising detecting a pen use event; and responsive to the pen use event, displaying, on a display of the electronic device, at least one virtual button which performs the same function as a physical button that is part of the electronic device; wherein the physical button of the electronic device comprises at least one of a mechanical switch and an optical switch.

According to another aspect of the disclosure, an electronic device is provided comprising: a display; a physical button that comprises at least one of a mechanical switch and optical switch; and a processor configured to: detect a pen use event; and responsive to the pen use event, display, on the display, at least one virtual button which performs the same function as the physical button.

Other aspects, advantages, and salient features of the disclosure will become apparent to those skilled in the art from the following detailed description, which, taken in conjunction with the drawings, discloses further examples of the above techniques.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of the examples provided herein. It includes various specific details to assist in that understanding but these are to be regarded as merely examples. Accordingly, those of ordinary skill in the art will recognize that various changes and modifications of the examples described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description is provided for illustrative purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, an electronic device represents any electronic device supporting a touch pen input function. For example, the electronic device can include a mobile communication terminal, a smart phone, a tablet Personal Computer (PC), a digital camera, an MP3 player, a navigation system, a laptop, a netbook, a computer, a television, a refrigerator, an air conditioner, and/or any other suitable device.

Figure 1A:
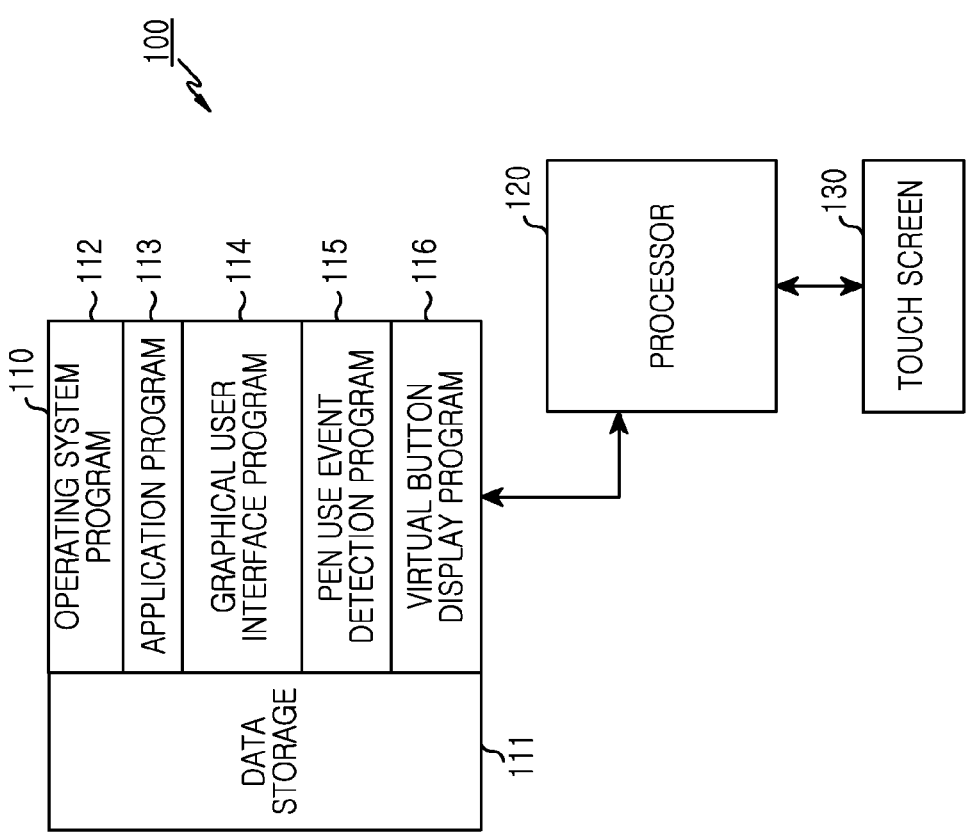
FIG. 1A is a block diagram of an electronic device for displaying a virtual button according to aspects of the disclosure.

FIG. 1A is a block diagram of an electronic device 100 for displaying a virtual button according to aspects of the disclosure. The electronic device 100 includes a memory 110, a processor 120, and a touch screen 130. A plurality of memories 110 and a plurality of processors 120 can also be included.

The memory 110 includes a data storage 111, an operating system program 112, an application program 113, a graphical user interface program 114, a pen use event detection program 115, and a virtual button display program 116. In some implementations, each program can be a software component that includes one or more processor-executable instruction. Thus, in some instances, the programs may be referred to as instruction sets or modules.

The data storage 111 stores data generated and/or used during the operation of the device 100. The data storage 111 can store information about a threshold region of a display which is predefined for displaying a virtual button. For example, the data storage 111 can store the information about first, second, and third threshold regions for detecting pen use in a display area (e.g., in the touch screen 130) and displaying the virtual button when the pen use is detected. In some implementations, the first, second, and third threshold regions can be different from one another.

The data storage 111 can store information about a function mapped to the virtual button. The function mapped to the virtual button can be a function of a physical button of the electronic device. The physical button may include any button on the device 100 that is not implemented by using the touch screen 130. The physical button may include a mechanical switch, an optical switch, and or any other suitable type of the switch. By way of example, the physical button can include at least one of a volume control button, a home button, a cancel button, an OK button, a power button, a menu button, and/or any other suitable type of button.

In some aspects, the data storage 111 can store processor-executable instructions implementing the same functionality as the one performed by a first volume control button of the electronic device 100. That processor-executable code may be executed when a first virtual button is activated, thereby causing the first virtual button to perform substantially the same function as its physical counterpart. As another example, the data storage 111 can store processor-executable code implementing the same functionality as the one performed by a physical home button of the electronic device 100. The processor-executable code may be executed when a second virtual button is activated, thereby causing the second virtual button to perform substantially the same function as the physical home button. As yet another example, the data storage 111 can store processor-executable code implementing the same function as the one performed by a physical power on/off button of the electronic device 100. That function may be executed when a third virtual button is activated, thereby causing the third virtual button to perform substantially the same function as the physical power on/off button.

The operating system program 112 (e.g., the embedded operating system such as WINDOWS, LINUX, Darwin, RTXC, UNIX, OS X, or VxWorks) includes various software components for controlling general system operations. These include, e.g., memory management and control, storage hardware (device) control and management, and power control and management. The operating system program 112 processes normal communication between various hardware (devices) and software components (programs).

The application program 113 includes applications such as browser, e-mail, message, word processing, address book, widget, Digital Right Management (DRM), voice recognition, voice reproduction, position determining function, location based service, and call.

The graphical user interface program 114 includes at least one software component for providing a user interface using graphics between a user and the electronic device 100. That is, the graphical user interface program 114 includes at least one software component for displaying user interface information on the touch screen 130. The graphical user interface program 114 includes an instruction for displaying virtual button(s) in a certain region of the display. For example, the graphical user interface program 114 can display the first virtual button in a first predetermined region. As another example, the graphical user interface program 114 can display the second user interface program in a second predetermined region of the display. As yet another example, the graphical user interface program 114 can display the third virtual button in a third region of the display. In some instances, the first region, the second region, and the third region may be different from one another.

Furthermore, the graphical user interface program 114 can display the first virtual button as having the same shape and/or color as the physical volume button. As another example, the graphical user interface program 114 can display the second virtual button as having the same shape and/or color as the physical home button. However, the virtual buttons are not limited to having the shape and/or color of their physical counterparts and they may have any suitable shape or color, including any figure, any line, or combination thereof, that is displayable by the graphical user interface program 114.

Further, the graphical user interface program 114 can display the virtual buttons semi-transparently or in preset size and shape, to facilitate the display control. The graphical user interface program 114 can display the virtual button in areas (or regions) of the display that are close to their physical button counterparts. That is, for example, the location of the first region where the first virtual button can be displayed, may be selected based on the location in the device 100 of the physical button performing the same (or similar) function as the first virtual button. Additionally or alternatively, the graphical user interface program 114 can display the virtual buttons in a predetermined region of the display regardless of the location in the electronic device 100 of the physical button counterparts of the virtual buttons.

The pen use event detection program 115 detects a pen use event, and sets the electronic device 100 to a pen mode responsive to detecting the pen use event. For example, when: the pen attached to the electronic device 100 is separated from the electronic device 100, a touch of the pen is detected, and/or the pen is detected within a threshold distance from the display, the pen use event detection program 115 can determine that a pen use event takes place. For example, when a pen attached to the electronic device 100 is detached, the pen use event detection program 115 can set the mode of the electronic device 100 to a pen use mode. Additionally or alternatively, as another example, when the touch of the pen is detected, the pen use event detection program 115 can set the electronic device 100 to a pen use mode. Additionally or alternatively, as another example, when the pen is detected within a threshold distance from the display of the electronic device 100, the pen use event detection program 115 can set the electronic device 100 the pen mode. In so doing, the pen use event detection program 115 can detect the pen within the threshold distance from the display, based on a well-known method such as hovering. In some instances, a pen mode of the device 100 may be any mode in which a pen is used to provide input to the touchscreen 130. The pen may include any suitable type of stylus for providing input to a touch screen, such as a digital pen, etc.

When the mode of the electronic device 100 is in pen mode, the pen use event detection program 115 may detect that the pen is used in a predetermined threshold region of the display. For example, the pen use event detection program 115 can detect the pen is used in the threshold region by sensing a pen touch in the threshold region of the display. As another example, the pen use event detection program 115 can detect that the pen is used in the threshold region by sensing that the pen is within a threshold distance from the display.

As noted above, the virtual button display program 116 can display the virtual button in the certain region of the touch screen 130. More specifically, when the pen use event detection program 115 detects the pen use in the preset threshold region, the virtual button display program 116 can display the virtual button in a predetermined display region. The displayed virtual button may perform the same function as a corresponding physical button of the electronic device 100.

Additionally or alternatively, when the pen use event detection program 115 detects pen use in the preset threshold region, the virtual button display program 116 can display the virtual button in the threshold region. For example, when the pen use is detected in a first threshold region of the display, the virtual button display program 116 can display the first virtual button in the first threshold region. As another example, when pen use is detected in a second threshold region of the display, the virtual button display program 116 can display the second virtual button in the second threshold region. As yet another example, when the pen use is detected in the third threshold region of the display, the virtual button display program 116 can display the third virtual button in the third threshold region.

The processor 120 can include at least one hardware processor (not shown) and a peripheral interface (not shown). The processor 120 executes a particular program (instruction set) stored in the memory 110 and conducts particular functions corresponding to the program.

The touch screen 130 is a touch-sensitive display and provides an interface for the touch input/output of data in the electronic device 100. The touch screen 130 can detect touch input (or contact) through a touch sensor (not shown), send the detected touch input to the electronic device 100, and provide a visual output to the user. That is, in response to the touch input, the touch screen 130 provides visual output to the user, such as text, graphics, and video, for example.

As noted, the touch screen 130 may include a touch-sensitive surface for detecting touch input, such as touch input using haptic contact, tactile contact, or their combination. For example, a detected touch point on the touch screen 130 may corresponds to a touch by a user's finger. Additionally or alternatively, a detected touch point on the touch screen 130 can correspond to a touch by a pen (e.g., a stylus).

The touch screen 130 provides an interface for the touch input/output between the electronic device 100 and the user. Namely, the touch screen 130 is a medium for sending the user's touch input to the electronic device 100 and representing the visual output of the electronic device 100 to the user. The touch screen 130 can adopt various display technologies such as Liquid Crystal Display (LCD), Light Emitting Diode (LED), Light emitting Polymer Display (LPD), Organic LED (OLED), Active Matrix OLED (AMOLED) or Flexible LED (FLED). The touch screen 130 is not limited to a touch screen using those display technologies. The touch screen 130 can detect the contact start, the contact movement, or the contact abortion or end of a user gesture on the touch-sensitive surface using, but not limited to, various touch detection (sensing) techniques such as capacitive, resistive, infrared or surface sound wave detections. The touch screen 130 can detect a pen within the threshold distance from the touch screen 130. In so doing, the touch screen 130 can detect the pen within the threshold distance from the display, based on the well-known method such as hovering. When detecting the pen in the preset threshold region, the touch screen 130 can display a virtual button. For example, when detecting the touch of the pen in the preset threshold region, the touch screen 130 can display the virtual button. By contrast, when detecting the pen in other region than the preset threshold region, the touch screen 130 can refrain from displaying the virtual button.

Figure 1B:
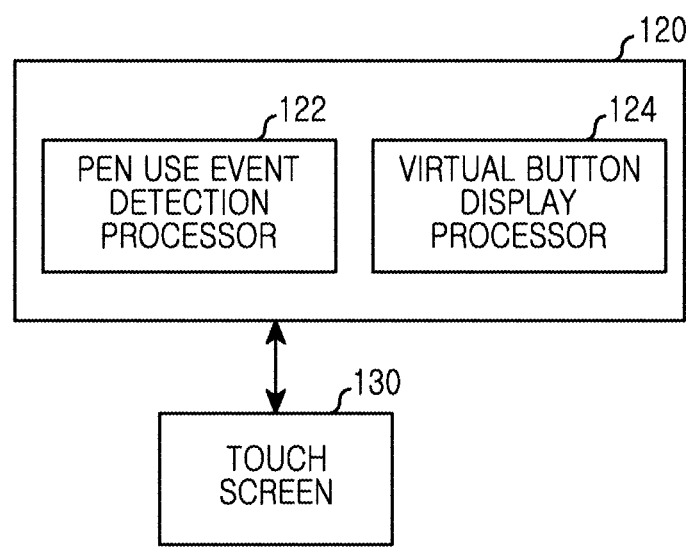
FIG. 1B is a block diagram of a processor for displaying the virtual button according to aspects of the disclosure.

FIG. 1B is a block diagram of the processor for displaying the virtual button according to an exemplary embodiment of the present invention. As shown, the processor 120 includes a pen use event detection processor 122 and a virtual button display processor 124.

The pen use event detection processor 122 may be configured to detect a pen use event, and set the mode of the electronic device 100 to pen mode in response. When a pen attached to the electronic device 100 is separated from the electronic device 100, when the touch of the pen is detected, or when the pen is detected within the threshold distance from the display, the electronic device 100 can determine that a pen use event takes place. For example, when the pen attached to the electronic device 100 is detached, the pen use event detection processor 122 can set the electronic device 100 to pen mode. As another example, when a touch of the pen is detected, the pen use event detection processor 122 can set the electronic device 100 to pen mode. As another example, when a pen is detected within a threshold distance from the display, the pen use event detection processor 122 can set the electronic device 100 to pen mode. In so doing, the pen use event detection processor 122 can detect the pen within the threshold distance from the display, based on the well-known method such as hovering.

When the electronic device 100 is in pen mode, the pen use event detection processor 122 may detect pen use in a threshold region of the display. For example, the pen use event detection processor 122 can detect pen use by sensing the pen touch the threshold region of the display. As another example, the pen use event detection processor 122 can detect pen use by sensing that the pen is within a threshold distance from the display.

The virtual button display processor 124 may display a virtual button in a predetermined region of the display. More specifically, in some implementations, when the pen use event detection processor 122 detects pen use in a preset threshold region, the virtual button display processor 124 may display the virtual button in the region where a pen touch is detected, the threshold region, or a predetermined display region. For example, when pen use is detected in the first threshold region of the display, the virtual button display processor 124 can display the first virtual button in the first threshold region. As another example, when pen use is detected in the second threshold region of the display, the virtual button display processor 124 can display the second virtual button in the second threshold region. As yet another example, when pen use is detected in the third threshold region of the display, the virtual button display processor 124 can display the third virtual button in the third threshold region.

Figure 2A:
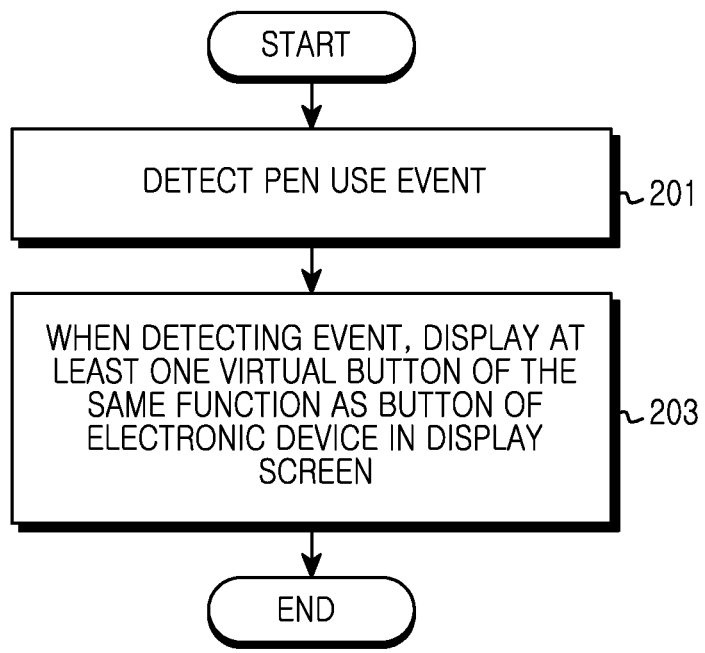
FIG. 2A is a flowchart of a method for displaying the virtual button when the electronic device detects a pen use event according to an exemplary embodiment of the present invention.

FIG. 2A is a flowchart of a process for displaying virtual buttons when the electronic device 100 detects a pen use event according to aspects of the disclosure. Referring to FIG. 2A, the electronic device 100 detects the pen use event in step 201. The pen use event can be detected by determining whether the pen attached to the electronic device 100 is detached from the electronic device 100, whether the pen touch is detected, or whether the pen is detected within the threshold distance from the display of the electronic device 100. In some instances, a pen is considered detached from the electronic device when the pen is removed from a holder located in or on the enclosure of the electronic device.

In step 203, the electronic device 100 can display at least one virtual button having the same (or similar function) as a physical button that is part of the electronic device 100. The at least one virtual button can be displayed responsive to detecting the pen use event. In some instances, the electronic device 100 can display the virtual button when the pen use event is detected anywhere on the display screen of the electronic device. Additionally or alternatively, in some instances, the electronic device 100 can display the virtual button when the pen use is detected in a predetermined threshold region of the display. In particular, when the pen use is detected in the preset threshold region of the display, the electronic device 100 can display a plurality of virtual buttons, wherein each virtual button has a function that is the same (or similar) to the function of a physical button that is part of the electronic device 100. In that regard, the virtual buttons in the plurality can correspond to some of or every one of the physical buttons that are part of the electronic device 100. The electronic device 100 can display the virtual button(s) in a region where a pen touch is detected or elsewhere.

Figure 2B:
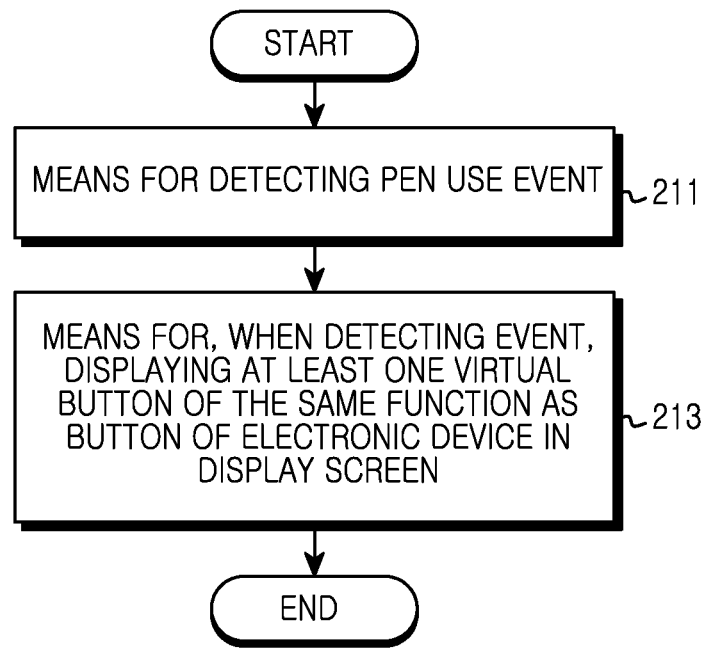
FIG. 2B is a diagram of means for displaying the virtual button when the electronic device detects the pen use event according to an exemplary embodiment of the present invention.

FIG. 2B depicts means for displaying the virtual button when the electronic device 100 detects the pen use event according to an exemplary embodiment of the present invention.

Referring to FIG. 2B, the electronic device 100 includes a means 211 for detecting the pen use event. In more detail, the electronic device 100 can includes a means for determining whether the digital pen attached to the electronic device 100 is detached from the electronic device 100, a means for detecting the pen touch, and a means for whether the digital pen is detected within the threshold distance from the display, The electronic device 100 includes a means 213 for, when the event is detected, displaying at least one virtual button of the same function as the button of the electronic device 100, in the display screen. In detail, the electronic device 100 includes a means for, when the event is detected, displaying that the virtual button to be displayed has the same function as the physical button and/or the light button of the electronic device 100. Further, the electronic device 100 can includes a means for, when the event is detected, semi-transparently displaying the virtual button to facilitate the display control of the electronic device 100.

Figure 3:
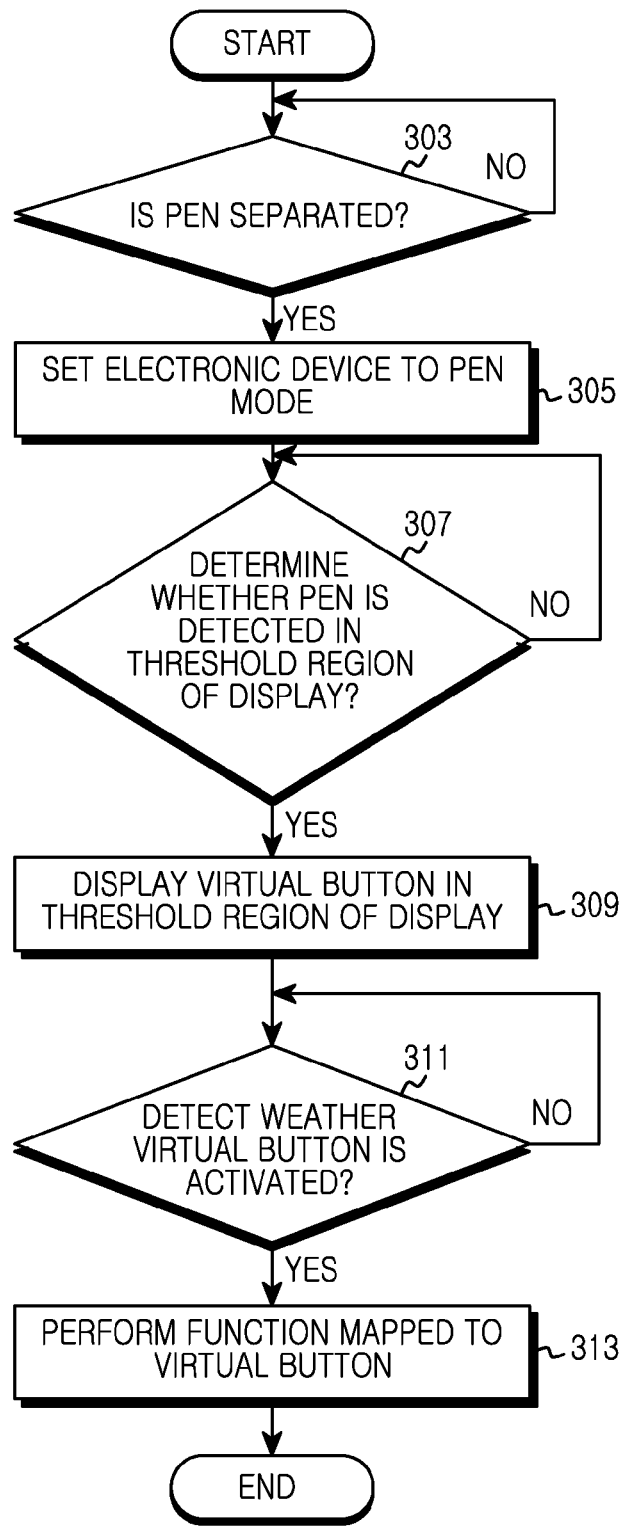
FIG. 3 is a flowchart of a process for displaying the virtual button when a pen is detached from the electronic device according to aspects of the disclosure.

FIG. 3 depicts a flowchart of a process for displaying a virtual button when a pen is detached from the electronic device 100 according to aspects of the disclosure. In step 303, the electronic device 100 determines whether a pen is separated from the electronic device 100. In some instances, the pen may be considered separated from the electronic device when the pen is removed from a holder that is located in or on the enclosure of the electronic device. If the pen is not separated from the electronic device 100, step 303 is repeated.

Figure 5:
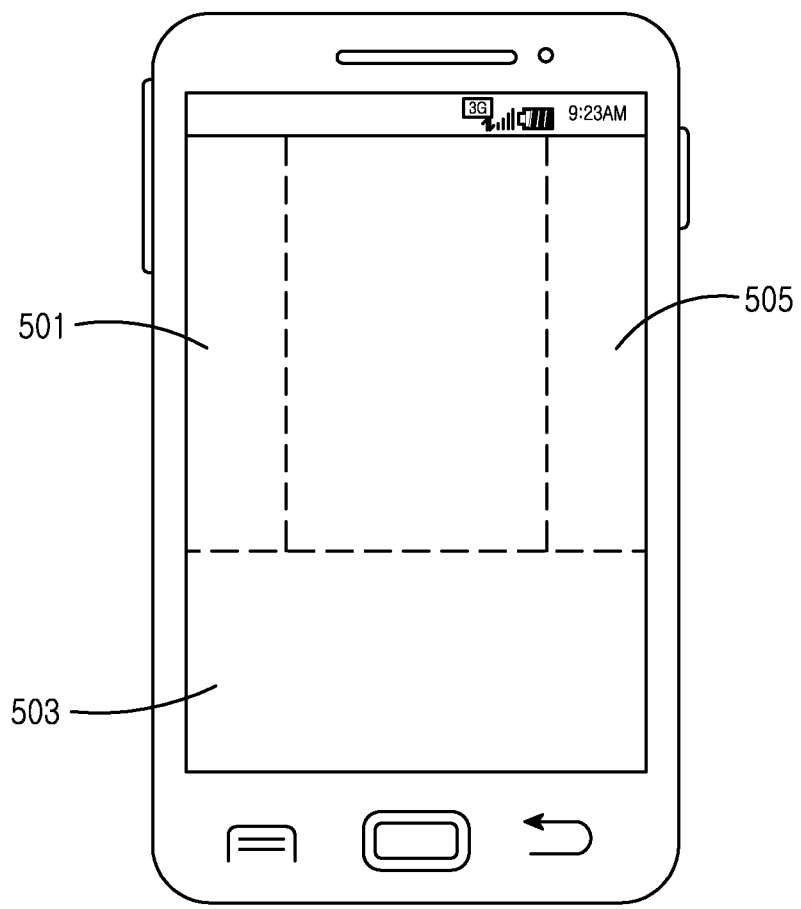
FIG. 5 is a diagram of first, second, and third preset threshold regions in the display of the electronic device according to aspects of the disclosure.

Otherwise, if the pen is separated from the electronic device 100, the electronic device 100 enters pen mode in step 305 and determines whether pen use is detected in a threshold region of the display in step 307. For example, the electronic device 100 determines whether the pen use is detected in the preset first threshold region 501, second threshold region 503, and third threshold region 505 as shown in FIG. 5. In some instances, the electronic device 100 can detect the pen use by sensing that the pen has touched one of the threshold regions and/or by sensing that the pen has come within a threshold distance from a portion of the display of the electronic device 100 where the threshold region is located.

In step 309, the electronic device 100 displays a virtual button in a predetermined region of the display of the electronic device 100 in step 309. As noted above, the virtual button may perform the same or similar function to a physical button that is part of the electronic device 100. For example, when detecting the touch of the pen in the second threshold region 503, the electronic device 100 can display a virtual button having the same function as a physical menu button, a virtual button having the same function as a physical home button, and/or a virtual button having the same function as a physical cancel button. For example, when detecting a touch of the pen in the third threshold region 505, the electronic device 100 can display a virtual button having the same function as a physical power on/off button that is part of the electronic device 100. Additionally or alternatively, as another example, when detecting the pen within the threshold distance from the display in the first threshold region 501, the electronic device 100 can display a virtual button having the same function as a physical volume control button that is part of the electronic device 100. Additionally or alternatively, as yet another example, when detecting the pen within a threshold distance from the display in the second threshold region 503, the electronic device 100 can display a virtual button having the same function as the physical menu button, a virtual button having the same function as the physical home button, and a virtual button having the same function as the physical cancel button. In other words, in some instances, the type of virtual button that is displayed may depend on the region of the display screen where a pen use is detected. In addition, each of the virtual buttons may be displayed as having a first visual characteristic (e.g., color, shape, etc.) that is the same or similar to second visual characteristic (e.g., color, shape, etc.) that is possessed by the physical button counterpart of the virtual button.

In step 311, the electronic device 100 determines whether the displayed virtual button is activated. In so doing, the electronic device 100 determines whether the virtual button is touched by a pen or whether the pen is detected within the threshold distance from the display. When the virtual button is not activated, step 311 is repeated. Otherwise, when the virtual button is activated, the electronic device 100 performs the function mapped to the virtual button in step 313. As noted above, the function may include changing the sound volume of the electronic device 100, powering off the electronic device 100, displaying a home screen (or menu), and/or any other suitable function that is also performed by a physical button that is part of the electronic device.

Figure 4:
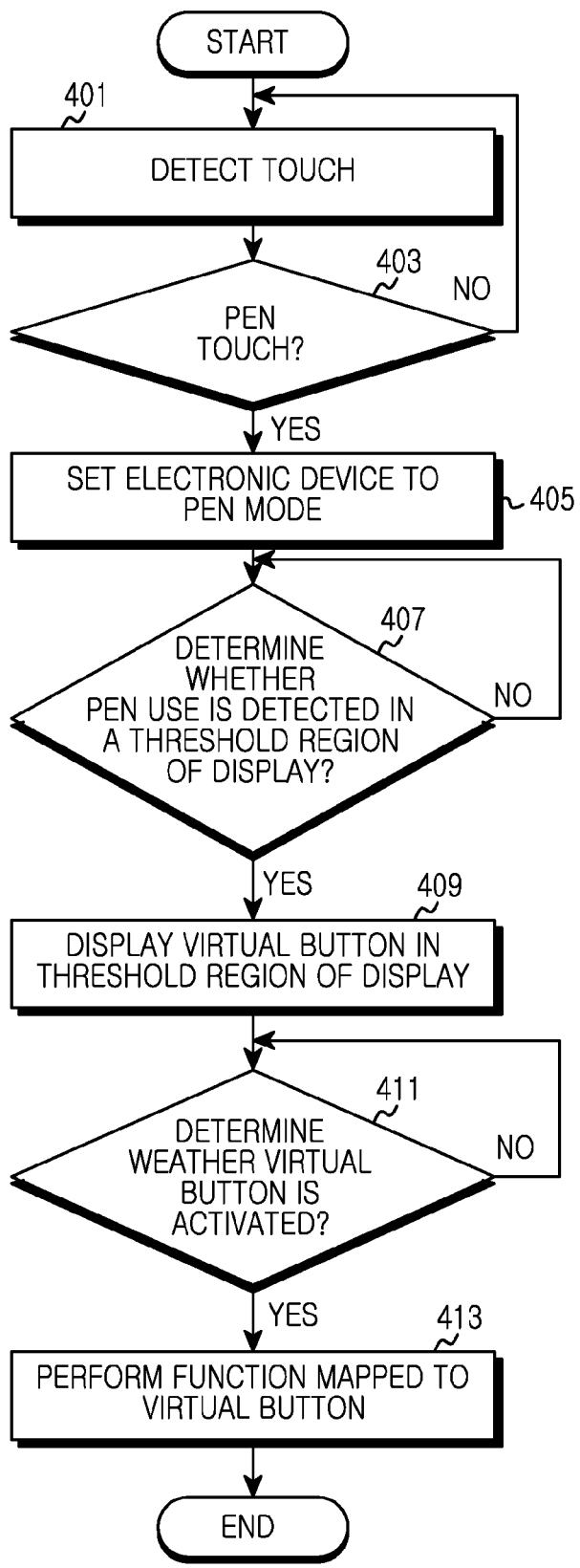
FIG. 4 is a flowchart of another process for displaying the virtual button when a pen is detached from the electronic device according to aspects of the disclosure.

FIG. 4 depicts a method for displaying a virtual button according to aspects of the disclosure. Referring to FIG. 4, the electronic device 100 detects a touch on its display in step 401 and determines whether the detected touch is a pen touch in step 403. As noted above, a pen touch may be either a direct touch on the display by the pen or a positioning of the pen within a threshold distance from the display. When the detected touch is not a pen touch, the process returns to step 401. Otherwise, when the detected touch is a pen touch, the electronic device 100 sets the electronic device 100 to pen mode in step 405 and determines whether pen use is detected in a preset threshold region of the display in step 407. For example, the electronic device 100 may determine whether the pen use is detected in the first, second, and third threshold regions as shown in FIG. 5. The electronic device 100 can detect the pen use by sensing a direct touch by the pen on the display or by sensing that the pen is positioned within a threshold distance from the display.

In step 409, the electronic device 100 displays a virtual button in a predetermined region of the display. The virtual button may perform the same (or similar) function to a physical button that is part of the electronic device 100. For example, when detecting the pen use in the second threshold region 503, the electronic device 100 can display a first virtual button 601, a second virtual button 603, and a third virtual button 605 having the same function as a physical menu button 607, a physical home button 609, and a physical cancel button 611, respectively (See FIG. 6). As another example, when detecting pen use in the first threshold region 501, the electronic device 100 can display a first virtual button 701 and a second virtual button 703 having the same function as physical volume control buttons 705 (See FIG. 7). As yet another example, when detecting pen use in the second threshold region 503, the electronic device 100 can display a first virtual button 801, a second virtual button 803, and a third virtual button 805 having the same function as physical menu button 807, a physical home button 809, and a physical cancel button 811 respectively (See FIG. 8).

In step 411, the electronic device 100 determines whether the displayed virtual button is activated. In so doing, the electronic device 100 determines whether the virtual button is touched by a pen or whether the pen is detected within the threshold distance from the display. By contrast, the virtual button has not been activated, step 411 is repeated.

Figure 6:
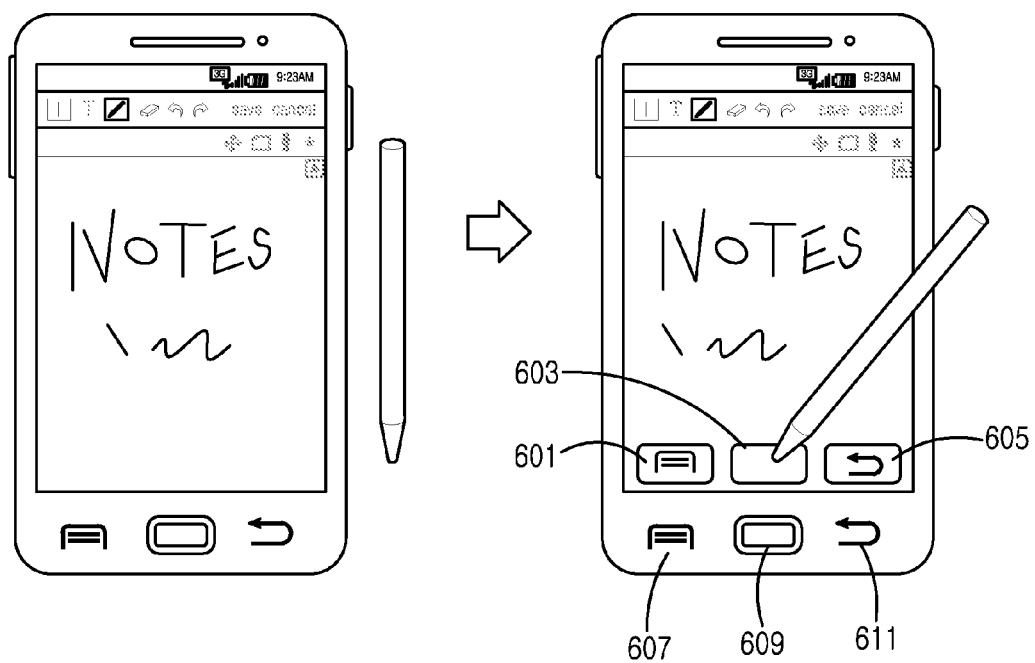
FIG. 6 is a diagram depicting an example of the virtual button according to aspects of the disclosure.
Figure 7:
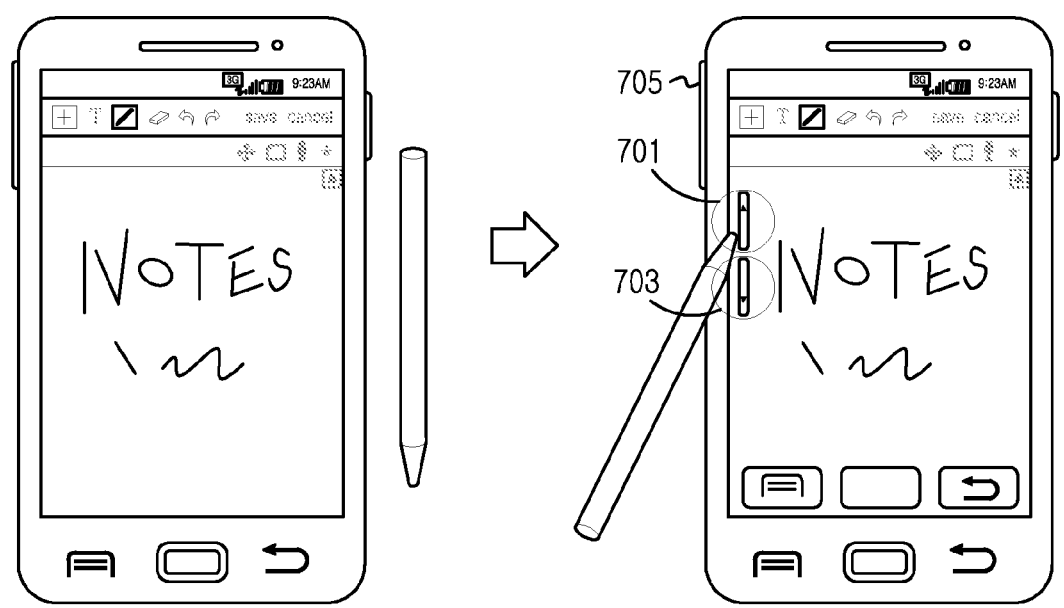
FIG. 7 is a diagram depicting another example of the virtual button according to aspects of the disclosure.
Figure 8:
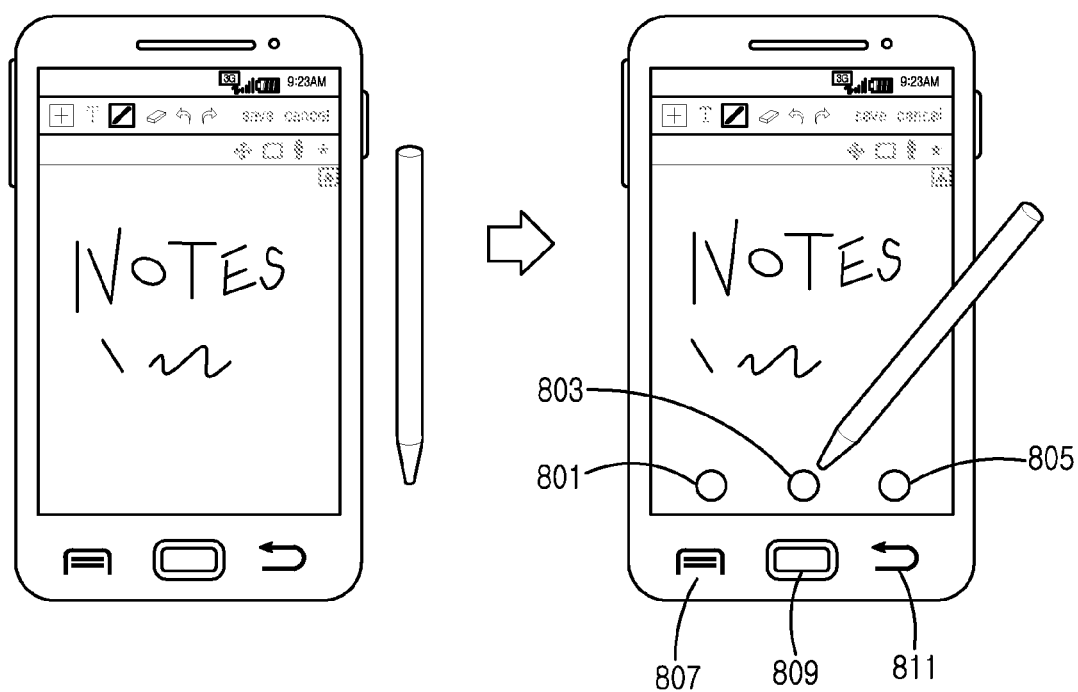
FIG. 8 is a diagram depicting yet another example of the virtual button according to aspects of the disclosure.

Upon detecting that the virtual button is activated, the electronic device 100 performs the function mapped to the virtual button in step 413. For example, when detecting the pen touch on the first virtual button 601 as shown in FIG. 6, the electronic device 100 functions as if the menu button of the electronic device 100 is touched or pressed. As another example, when detecting the pen touch on the first virtual button 701 as shown in FIG. 7, the electronic device 100 functions as if a first one of the volume control buttons 705 is touched or pressed. As yet another example, when detecting the pen touch on the second virtual button 803, as shown in FIG. 8, the electronic device 100 functions as if the home button of the electronic device 100 is touched or pressed.

The examples described herein can be implemented as computer software that is executed by a processor, firmware, hardware, a non-transitory machine readable medium, and/or any combination thereof. The non-transitory machine-readable medium may be a machine-readable storage medium, a machine-readable storage substrate, a memory device, a material affecting a machine-readable propagated stream, or a combination of one or more of these. The term 'data processor' encompasses every device, apparatus, and machine including, for example, a programmable processor, a computer, a multiple processors, or a computer, for processing data.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the disclosure has been presented with reference to certain specific examples, it will be understood by those skilled in the art that various changes in form and details may be made therein without departing from the spirit and scope of the disclosure as defined by the appended claims and their equivalents.

What is claimed is:

1. A method for using a pen in an electronic device, comprising:
    detecting a pen use event; and
    responsive to the pen use event, displaying, on a display of the electronic device, a virtual button which performs substantially the same function as a physical button that is part of the electronic device;
    wherein the physical button comprises at least one of a mechanical switch and an optical switch, and the virtual button is displayed in a region of the display that is selected based on a location of the physical button on the electronic device.

2. The method of claim 1, further comprising:
    determining whether the pen is detached from the electronic device; and
    when the pen is detached from the electronic device, detecting the pen use event.

3. The method of claim 1, further comprising:
    determining whether a pen touch on a display of the electronic device is detected; and
    when detecting the pen touch on the display of the electronic device, detecting the pen use event.

4. The method of claim 1, further comprising:
    determining whether the pen is located within a preset threshold distance from the display of the electronic device; and when the pen is located within the preset threshold distance from the display of the electronic device, detecting the pen use event.

5. The method of claim 1, further comprising:
    determining whether the pen is used in at least one preset region of the display;
    wherein the virtual button is displayed when it is determined that the pen is used in the at least one preset region of the display; and
    wherein the virtual button remains hidden when it is determined that the pen is used outside of the at least one preset region.

6. The method of claim 5, further comprising:
  detecting a pen touch in the at least one preset region of the display;
  wherein the pen is determined to be used when detecting the pen touch in the at least one preset region.

7. The method of claim 5, further comprising:
  determining whether the pen is located within a preset threshold distance from the display; and
  detecting the pen use in the at least one preset region when the pen is located within the preset threshold distance from the display.

8. The method of claim 5, wherein the virtual button is displayed in the at least one preset region of the display.

9. The method of claim 1, wherein a shape and a type of the virtual button comprise a figure, a line, or a combination of the figure and the line.

10. An electronic device for receiving input via a pen, comprising:
  a display;
  a physical button that comprises at least one of a mechanical switch and an optical switch; and
  a processor configured to:
  detect a pen use event; and
  responsive to the pen use event, display, on the display, at least one virtual button which performs substantially the same function as the physical button,
  wherein the virtual button is displayed in a region of the display that is selected based on a location of the physical button on the electronic device.

11. The electronic device of claim 10, wherein the processor is further configured to:
  determine whether the pen is detached from the electronic device;
  wherein the pen use event is detected when the pen is detached from the electronic device.

12. The electronic device of claim 10, wherein the processor is further configured to:
  detect a pen touch on the display;
  wherein the pen use event is detected based on the pen having touched the display.

13. The electronic device of claim 10, wherein the processor is further configured to:
  determine whether the pen is located within a preset threshold distance from the display;
  wherein the pen use event is detected based on the pen is found within the preset threshold distance from the display.

14. The electronic device of claim 10, wherein the processor IS further configured to:
  determine whether the pen is used in at least one preset region of the display;
  wherein the virtual button is displayed when it is determined that the pen is used in the at least one preset region of the display; and
  wherein the virtual button remains hidden when it is determined that the pen is used outside of the at least one preset region.

15. The electronic device of claim 14, wherein the processor IS further configured to:
  detect a pen touch in the at least one preset region of the display;
  wherein the pen is determined to be used in the at least one preset region of the display based on the pen having touched the at least one preset region of the display.

16. The electronic device of claim 14, wherein the processor IS further configured to:
  determine whether the pen is located within a preset threshold distance from the display; and
  wherein the pen is determined to be used in the at least one preset region of the display based on the pen having been found within the preset threshold distance from the display.

17. The electronic device of claim 14, wherein the virtual button is displayed in the at least one preset region of the display.

18. The electronic device of claim 14, wherein a shape and a type of the virtual button comprise a figure, a line, or a combination of the figure and the line.

* * * * *